July 3, 1951
E. C. THEISS
2,558,797
AIR INDUCTION SYSTEM FOR TURBO-SUPERCHARGED
AIRCRAFT ENGINES, INCLUDING AIR INTERCOOLER
AND AIR INTERWARMER
Filed May 20, 1949
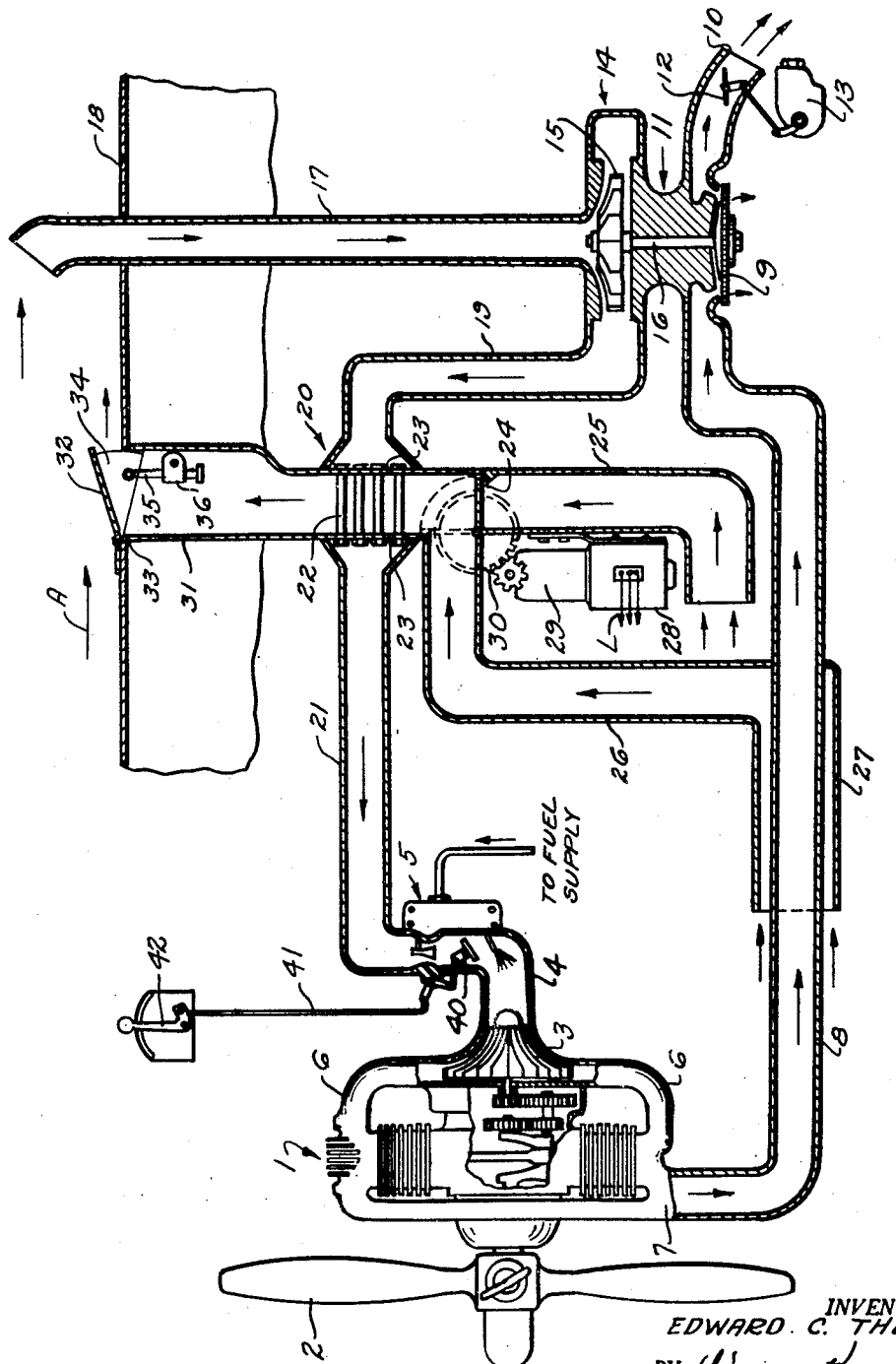
INVENTOR.
EDWARD C. THEISS
BY Will Koontz AND
ATTORNEY
Charles L. Burgoyne
AGENT

UNITED STATES PATENT OFFICE 2,558,797

AIR INDUCTION SYSTEM FOR TURBO-SUPERCHARGED AIRCRAFT ENGINES, INCLUDING AIR INTERCOOLER AND AIR INTERWARMER

Edward C. Theiss, Dayton, Ohio

Application May 20, 1949, Serial No. 94,492

6 Claims. (Cl. 123—122)

(Granted under the act of March 3, 1883, as amended April 30, 1928; 370 O. G. 757)

The invention described herein may be manufactured and used by or for the United States Government for governmental purposes without payment to me of any royalty thereon.

The present invention relates to an air induction system for turbo-supercharged aircraft engines and including a combination air intercooler and air interwarmer.

The primary object of the invention is to provide an air induction system for turbo-supercharged aircraft engines wherein the air intercooler used to cool the induction air after leaving the supercharger may be alternately connected to a source of warm air to become an air interwarmer when outside air temperatures are in the subzero range.

A further object of the invention is to provide an air induction system for a turbo-supercharged aircraft engine wherein part of the heat normally dissipated from the exhaust pipe may be used to warm the air flowing to the engine from the outside atmosphere.

Another object of the invention is to provide an air induction system for a turbo-supercharged aircraft engine wherein a heat exchanger or heat transfer unit is included in the system and is arranged in combination with a heat valve to heat or cool the air being fed to the engine by way of the heat transfer unit.

Another object of the invention is to generally improve the operating characteristics of turbo-supercharged aircraft engines and extend the field of usefulness thereof, and particularly to improve the operation thereof in subzero weather.

The above and other objects of the invention will become apparent upon reading the following detailed description of the invention in conjunction with the accompanying drawing, in which the single figure is a schematic view of the present air induction system as applied to a piston-type radial engine suitable for use in propelling an aircraft.

In turbo-supercharged aircraft engines the air induction system usually includes an intercooler unit to cool the air which has been compressed in the turbo-supercharger before it reaches the engine carburetor. If this were not done in most cases the engine would run too hot and the valves would soon burn out. However, even though the air intercooler may be shut off almost completely when desired, it has been found that in cold climates or very high altitudes the engine may run too cold and thus stall unexpectedly. This is most apt to occur in a glide or at any time the power output is low. Therefore according to the principles of the present invention it is proposed to provide an air interwarmer as well as an air intercooler, the same heat transfer unit serving both functions alternately depending on the temperature of the air passing over and around the tubes of the unit.

For a detailed description of the present air induction system reference is made to the drawing. The radial type of aircraft engine 1 is used to drive the aircraft propeller 2. The engine may include a geared blower 3 to provide a pressure boost for the incoming air-fuel mixture flowing in the conduit or intake pipe 4 from the carburetor 5. The air-fuel mixture flows to the engine cylinders by way of the intake manifolds 6, and after burning in the cylinders is exhausted by way of the exhaust manifold 7. The steady flow of hot exhaust gases through the exhaust pipe 8 is expelled to the atmosphere both through the gas turbine 9 and the tail pipe 10. The turbine 9 is the driving unit of the turbo-supercharger 11. The gases which flow from the tail pipe 10 flow around the mounting for the turbine wheel but as the waste gate 12 is closed or moved toward closed position less gas can flow from the tail pipe, therefore more gas must escape through the turbine wheel. This causes speeding up of the turbine and turbo-supercharger to give an increased supercharging action. The position of the waste gate 12 is determined by the action of the reversible waste gate motor 13. In actual practice the operation of the waste gate motor is by an automatic control circuit, which employs a pressure responsive means connected to the engine intake manifold to provide such regulation of the waste gate as to result in a constant manifold pressure at varying altitudes. However the waste gate motor may be controlled by a manual switching device if desired.

The variable speed supercharger 11 further includes a blower section 14 comprising a casing within which is rotatably mounted a rotor wheel 15 carried on the same shaft 16 which carries the turbine wheel 9. The central inlet of the turbo-supercharger connects by a conduit or stack 17 to the outside atmosphere, the stack passing through the wall 18 of the aircraft engine cowling. The centrifugal compressor or blower draws outside air in the direction of the arrows and the compressed air passes on toward the engine by way of conduit 19. Because of the work done on the air in compressing it, the compressed air leaving the turbo-supercharger or blower 14 is at a higher temperature than the air taken in through stack 17. Therefore the air is normally passed through a heat exchanger 20 where it is cooled down before flowing through conduit 21 to the carburetor 5. If the intercooler action were not applied the air would cause the engine 1 to run too hot and the engine would soon be ruined. However it should be noted that cooling of the air is not necessary when the incoming air is at low temperatures, say from 32° F. down to 0° F. When the outside air temperature is below zero it is desirable to heat the compressed air as it passes through the heat transfer unit 20, this unit then serving as an air interwarmer. At very low outside temperatures, say from −20° F. down to −65° F. it is almost imperative that this heating action be used to prevent engine stalling at low power output.

The heat transfer unit 20 may take various forms but as shown in the drawing is preferably made by inserting a multiplicity of metal tubes 22 in a pair of pierced end plates 23. There may be several banks of tubes 22 and as shown the tubes extend between conduits 19 and 21 to conduct the supercharged air toward the engine 1. There being spaces between the tubes of each bank and also between the successive banks, air may pass over and around the tubes to cool or heat the tubes depending on whether the outside air entering the supercharger through stack 17 is at normal temperature or at low temperature. Below the unit 20 is a heat valve 24 which may assume two positions at about a right angle to each other. The full line position of the pivoted valve 24 closes off the supply of cool outside air entering through conduit 25, while the dotted line position thereof closes off the supply of hot air entering through conduit 26. Heating of the air entering the heat exchanger through conduit 26 is accomplished by means of a jacket or shroud 27 around the exhaust pipe 8 and concentrically spaced therefrom to allow air to enter from the outside and be warmed up as it passes along over the exhaust pipe. The position of heat valve 24 may be adjusted by means of the servo-motor 28 operating through a reduction drive unit 29 to drive a gear 30 fixed on the same shaft which serves to pivotally mount the heat valve 24. The servomotor 28 is a reversible electric motor connected to a current source and switching means through leads L. In practice the heat valve is usually placed in either of the two positions shown, a position indicator being used on the instrument board to show the instant relative position. However it is possible to set the valve 24 in an intermediate position to permit a selected mixture of hot and cool air to pass through the heat exchanger 20. With the two position system preferred, the full line position of valve 24 is selected when the outside air temperature falls below 0° F. and the dotted line position is selected when the outside air temperature goes above 0° F.

The air passing over the tubes 22 from the sources of cool air or hot air flows on to a conduit 31 extending through the nacelle or cowling wall 18. The end of the conduit 31 is fitted with a flap 32 pivoted at 33 and extending toward the aft end of the aircraft, so that the air slipstream will pass thereover in the direction of arrow A. The opposite side edges of flap 32 are provided with downturned sides, as at 34, so that the only way for air to leave the conduit 31 is through the rearwardly directed opening below the free end of flap 32. By this arrangement the slipstream produces a reduced pressure rearwardly of the flap to cause outward flow from the conduit 31. Thus the flap and adjacent structure provides a combined aspirator and valve, since the rotative position of the flap may be varied. For this purpose the sides 34 of the valve member are connected by rack bars 35 to a rack guide 36, within which a pinion is rotatably mounted to move the rack and also the flap 32. The pinion may in turn be operated by a small reversible servomotor (not shown), so that adjustment of flap 32 may be accomplished from a remote control station. Because the volume of air flow through the heat transfer unit 20 is directly proportional to the degree of opening of flap 32, this valve means serves to regulate the rate of air flow through the unit 20 along the heat transfer medium path. Thus assuming that the heat valve 24 is positioned in either of its two extreme positions, as shown in the drawing, the valve 32 will always function to regulate the heating or cooling action of the heat transfer unit 20. A position indicator for the flap valve 32 is preferably used to show at all times the relative position thereof and the relative volume of heating or cooling air passing around the tubes of the heat transfer unit 20. It is further noted that because of the induced flow of air through the unit 20 by the action of the aspirator and valve 32, the outer ends of conduits 25 and 26 need not be directed into the air slipstream but may extend to any convenient opening in the engine nacelle or cowling. Thus it is possible and usually preferable to arrange the shroud 27, as well as the conduit 25, in such a manner as to eliminate the need for drag-producing scoops and further make it possible to contain the air intake conduits or conduit inlets within the confines of the engine nacelle structure.

The compressed air flowing in the conduit 21 is at a pressure only slightly over atmospheric at sea level but as the elevation increases the turbo-supercharger is speeded up by closing the waste gate 12 to some extent and thus causing more exhaust gas to pass out through the turbine 9. The turbo-supercharger thus overcomes the decreasing density of the air at higher altitudes by compressing the rarefied air to maintain a fairly constant manifold pressure at the engine. The air passing through the conduit 21 picks up atomized fuel as it passes by the carburetor 5 and the position of the throttle valve 40 determines the amount of air-fuel mixture reaching the engine, to govern the engine power output accordingly. The position of throttle valve 40 is adjusted by a suitable linkage 41 and throttle lever 42, the lever being located in the aircraft cabin adjacent to the other aircraft controls. A suitable automatic control system for the waste gate motor 13, whereby the engine intake manifold pressure may be maintained at a constant value, is disclosed in the patent to Bancroft No. 2,464,548 dated March 15, 1949.

The air supply system for an internal combustion engine as disclosed above is especially adapted for aircraft engines required to operate under widely varying and severe temperature conditions. By employing means to heat the air supply when temperatures reach the subzero range, the system ensures economy of operation and reliability. Also the simplicity and adaptability of the system to automatic control further recommends it for aircraft installation. It is further noted that the hot air fed to the heat valve 24 through conduit 26 may if desired come from a heater of any design, such as a combustion heater for instance. Besides promoting smoother engine operation in cold climates, the system with the heat valve set as in the drawing (solid lines) will also result in more rapid engine warm-up upon starting the engine from the cold condition. It is also to be understood that the heat valve may be adjusted to any desired position intermediate of the two positions illustrated and that in this case the entrance chamber of the heat exchanger will serve as a space in which the incoming hot and cold air streams may mix before passing into the exchanger and around the tubes thereof.

The embodiments of the invention herein shown and described are to be regarded as illustrative only and it is to be understood that the invention is susceptible to variations, modifications and changes within the scope of the appended claims.

I claim:

1. An air induction system for an aircraft engine comprising, a supercharger for compressing atmospheric air, conduit means to conduct the supercharged air to the aircraft engine, a heat transfer unit interposed in said conduit means having an air induction path open to said conduit means and further including a heat transfer medium path therethrough, means for conducting atmospheric air to said heat transfer unit, means for heating limited quantities of atmospheric air, means for conducting heated atmospheric air to said heat transfer unit, valve means settable in two extreme positions to direct said atmospheric air through said heat transfer unit along said heat transfer medium path in one position of said valve means and to direct said heated atmospheric air through heat transfer unit along said heat transfer medium path in the other position of said valve means, a second conduit means to conduct the heat transfer medium from said heat transfer unit to the atmosphere, and a pivoted flap extending over the outer end of said second conduit means to serve as a flow regulating valve and extending from the pivoted end thereof rearwardly of the aircraft to provide an aspirating means adapted when in open position to promote steady flow of said heat transfer medium through said heat transfer unit when the aircraft is in flight.

2. An air induction system for an aircraft engine as recited in claim 1, wherein said means for heating limited quantities of atmospheric air includes a shroud pipe surrounding the exhaust pipe in concentric relation thereto and open to the atmosphere at one end.

3. An air induction system for an aircraft engine comprising, conduit means to conduct atmospheric air to the aircraft engine intake manifold, a heat transfer unit interposed in said conduit means having an induction air path open to said conduit means and further including a heat transfer medium path therethrough, means for conducting unheated atmospheric air to said heat transfer unit, means for continuously heating limited quantities of atmospheric air, means for conducting said heated atmospheric air to said heat transfer unit, valve means settable in two extreme positions to direct said unheated atmospheric air through said heat transfer unit along said heat transfer medium path in one position of said valve means and to direct said heated atmospheric air through said heat transfer unit along said heat transfer medium path in the other position of said valve means, a second conduit means to conduct the heat transfer medium from said heat transfer unit to the atmosphere, a pivoted flap extending over the outer end of said second conduit means to serve as a flow regulating valve and extending from the pivoted end thereof rearwardly of the aircraft, and a reversible servomotor for remotely controlling the position of said pivoted flap.

4. An air induction system for an aircraft engine comprising, conduit means to conduct atmospheric air to the aircraft engine intake manifold, a heat transfer unit interposed in said conduit means having an induction air path open to said conduit means and further including a heat transfer medium path therethrough, means for continuously heating limited quantities of atmospheric air, means for conducting said heated atmospheric air to said heat transfer unit for passage therethrough along said heat transfer medium path, a second conduit means to conduct the heat transfer medium from said heat transfer unit to the atmosphere, a pivoted flap extending over the outer end of said second conduit means to serve as a flow regulating valve and extending from the pivoted end thereof rearwardly of the aircraft, and means for controlling the position of said pivoted flap.

5. An air induction system for an aircraft engine comprising, a supercharger for receiving air from the atmosphere and compressing said air, conduit means to conduct the supercharged air to the aircraft engine intake manifold, a heat transfer unit interposed in said conduit means having an induction air path open to said conduit means and further including a heat transfer medium path therethrough, means providing a heat valve chamber near the inlet side of said heat transfer medium path, means for conducting unheated atmospheric air to said heat valve chamber, means for continuously heating limited quantities of atmospheric air, means for conducting heated atmospheric air to said heat valve chamber, means movably mounted in said heat valve chamber for regulating the relative amounts of unheated and heated air entering said heat valve chamber for subsequent passage through said heat transfer unit along said heat transfer medium path, and servomotor for controlling the position of said movably mounted means.

6. An air induction system for an aircraft engine comprising, a supercharger for compressing atmospheric air, a first conduit means to continuously conduct unheated atmospheric air to the inlet side of said supercharger, a second conduit means to conduct supercharged atmospheric air from the outlet side of said supercharger to said aircraft engine, a heat transfer unit interposed in said second conduit means and including an air induction path which forms a continuation of said second conduit means, means in said heat transfer unit providing a heat transfer medium path therethrough, means providing a heat transfer medium inlet chamber open to the inlet side of said heat transfer medium path, a third conduit means to conduct unheated atmospheric air to said heat transfer medium inlet chamber, means for heating limited quantities of atmospheric air, a fourth conduit means to conduct heated atmospheric air to said heat transfer medium inlet chamber, a flap valve in said chamber pivotally mounted for movement therein and movable from one extreme position in which said third conduit means is closed to another extreme position in which said fourth conduit means is closed, said flap valve being adjustable to any desired intermediate position to permit entry of air from said third and fourth conduit means into said chamber for mixing thereof before the mixture flows along said heat transfer medium path, a servomotor for controlling the position of said flap valve, a fifth conduit means to conduct the air from the outlet side of said heat transfer medium path to the atmosphere, and means to induce a flow of air through said fifth conduit means toward the atmosphere.

EDWARD C. THEISS.

REFERENCES CITED

The following references are of record in the file of this patent:

UNITED STATES PATENTS

| Number | Name | Date |
|---|---|---|
| 2,368,642 | Crago | Feb. 6, 1945 |